United States Patent
Weber

(10) Patent No.: US 6,424,993 B1
(45) Date of Patent: Jul. 23, 2002

(54) METHOD, APPARATUS, AND COMPUTER PROGRAM PRODUCT FOR SERVER BANDWIDTH UTILIZATION MANAGEMENT

(75) Inventor: Jay C. Weber, Menlo Park, CA (US)

(73) Assignee: RespondTV, Inc., San Francisco, CA (US)

( * ) Notice: Subject to any disclaimer, the term of this patent is extended or adjusted under 35 U.S.C. 154(b) by 0 days.

(21) Appl. No.: 09/320,010

(22) Filed: May 26, 1999

(51) Int. Cl.$^7$ .............................................. G06F 13/00
(52) U.S. Cl. ........................ 709/203; 709/217; 709/224
(58) Field of Search ................................ 709/200, 201, 709/202, 203, 206, 217, 218, 219, 223, 224, 233, 235, 225

(56) References Cited

U.S. PATENT DOCUMENTS

| 5,686,902 A | | 11/1997 | Reis et al. ................... 340/825 |
|---|---|---|---|
| 5,721,823 A | * | 2/1998 | Chen et al. .................. 709/203 |
| 5,758,057 A | | 5/1998 | Baba et al. .................. 395/182 |
| 5,799,002 A | * | 8/1998 | Krishnan .................... 370/234 |
| 5,987,504 A | * | 11/1999 | Toga ........................... 709/206 |
| 6,085,221 A | * | 7/2000 | Graf ............................ 709/202 |
| 6,175,862 B1 | * | 1/2001 | Chen et al. .................. 709/218 |
| 6,216,006 B1 | * | 4/2001 | Scholefield et al. ........ 455/450 |
| 6,289,461 B1 | * | 9/2001 | Dixon ......................... 709/230 |

FOREIGN PATENT DOCUMENTS

| EP | 0917 380 A2 | 10/1998 |
|---|---|---|
| WO | WO 97/41654 | 4/1997 |
| WO | WO 98/26541 | 12/1997 |
| WO | WO 98/27441 | 12/1997 |

* cited by examiner

Primary Examiner—Moustafa M. Meky
(74) Attorney, Agent, or Firm—Blakely, Sokoloff, Taylor & Zafman LLP

(57) ABSTRACT

A system for management of communications bandwidth utilization is disclosed in which delays are deliberately introduced when responding to requests for resources. Appropriately introducing delays can disperse the peak bandwidth consumption event over a longer period, however peak bandwidth utilization is decreased when responding to numerous substantially simultaneous requests. The deliberately introduced delays can be generated in a range bounded above by an acceptable response time ("ART"). The ART may be communicated to a server as part of the request, for instance in the 'port' or 'path' portion of a URI.

25 Claims, 7 Drawing Sheets

METHOD, APPARATUS, AND COMPUTER PROGRAM PRODUCT FOR SERVER BANDWIDTH UTILIZATION MANAGEMENT

FIELD

Features of the invention relate generally to communications bandwidth utilization management and, more particularly, to management of bandwidth utilized by servers responding within acceptable time limits.

BACKGROUND

Conventionally, the request processing policy on single-machine server systems is to allocate computing cycles evenly among request-handling processes, and for those processes to complete as soon as possible. In multiple-server cluster systems ("server farms"), a load-balancing component typically distributes requests among machines evenly (or perhaps proportionately to their individual capacities), and then each machine executes the previous single-machine policy. Both cases optimize average response time, but potentially at the expense of other objectives. It would be desirable for a request processing method to exist that allowed other objectives to be optimized.

In situations where system operations cost is related to bandwidth utilization, it may be more desirable to optimize bandwidth utilization while keeping average response time merely acceptable. An example of this is the provision of servers for Internet services. Providers of such services typically buy bandwidth according to the "95% rule": after discarding the top 5%, the highest remaining bandwidth utilization sample determines the billing rate. Thus, lowering peak bandwidth utilization can reduce operations costs. Since bandwidth costs can constitute some 40% of total operations costs, the savings can be substantial. Accordingly it would be advantageous for means to exist that allowed system operators to reduce bandwidth costs by lowering peak bandwidth utilization.

One conventional solution for reducing peak bandwidth utilization is to serialize the processing of requests. This technique does peak reduce bandwidth utilization, however it does not provide a way in which response time can be kept within acceptable limits. Conventionally, keeping the acceptable response time ("ART") within acceptable limits involves allocation of bandwidth across request processes. However, this can be self-defeating if the overhead for such coordination is too high (e.g., which can happen when using interprocess communication), making it impossible to achieve ARTs. It is therefore desirable that means exist to efficiently reduce bandwidth utilization while maintaining ARTs.

Furthermore, ARTs can depend on the context of individual requests. If a user is waiting for the result of the request, response times should be quite short. However, if the request is to preload a document for potential future use, the response time can be quite large.

It is therefore desirable that a method, apparatus, and computer program product exist that allows for efficient bandwidth ultilization management while maintaining request response times within acceptable levels.

SUMMARY

In order to provide these and other objectives, one illustrative aspect of the present invention are methods for managing bandwidth utilization by a server in fulfilling requests for resources. An exemplary method includes receiving a request for a resource; delaying fulfillment of the request by a predetermined time period; and thereafter fulfilling the request for the resource. Delaying fulfillment of the request may include generating a delay value, the delay value being less than an acceptable response time; and waiting for a time interval at least as great as the delay value to elapse. In an additional feature, the delay value is an element of a sequence distributed substantially uniformly between zero and the acceptable response time, and the sequence can be a pseudo-random sequence.

In yet another illustrative aspect, receiving a request for a resource may include receiving a request for a resource with a request dispatch process; determining a delay value, the delay value determined with the request dispatch process; and dispatching the request and the delay value to a request handling process for handling. The acceptable response time may be received with the request, and the request may include a path identifying the resource and the path may include the acceptable response time.

An additional illustrative aspect involves programmed instructions configuring a computing apparatus for managing bandwidth utilization by a server in fulfilling requests for resources. The programmed instructions configure the computing apparatus to provide structures implementing particular functions. One illustrative computing apparatus is configured to include a request receiver configured for receiving a request for a resource; a response fulfillment delayer configured for delaying fulfillment of the request by a predetermined time period; and a request handler configured for fulfilling the request for the resource. The response fulfillment delayer may include a delay value generator configured for generating a delay value, the delay value less than an acceptable response time; and a timer configured for waiting for a time interval at least as great as the delay value to elapse. The delay value may be an element of a sequence distributed substantially uniformly between zero and the acceptable response time and the sequence may be a pseudo-random sequence.

In an additional aspect, the request receiver may include an acceptable response time receiver configured for receiving a request for a resource with a request dispatch process; a delay value determiner configured for determining a delay value with the request dispatch process; and a request dispatcher configured for providing the request and said delay value to a request handling process. The acceptable response time may be received with the request and the acceptable response time may be determined by a port through which the request arrives. Additionally, the request may comprise a path identifying the resource and the path may comprise the acceptable response time.

A still further aspect illustrative of features of the invention is a computer program product comprising a computer-readable medium having computer readable instructions encoded thereon for server bandwidth utilization management. An illustrative computer program product includes computer program instructions configured to cause a computer to receive a request for a resource; computer program instructions configured to cause a computer to delay fulfillment of the request by a predetermined time period; and computer program instructions configured to cause a computer to fulfill the request for the resource after expire of the predetermined time period. The instructions to delay fulfillment of the request may include computer program instructions configured to cause a computer to generate a delay value, the delay value being less than an acceptable response time; and computer program instructions configured to cause a computer to wait for a time interval at least as great as the delay value to elapse. The delay value may be an element of a sequence distributed substantially uniformly between zero and the acceptable response time, and the sequence may be a pseudo-random sequence.

As an additional aspect, computer program instructions configured to cause a computer to receive a request for a resource may include computer program instructions configured to cause a computer to receive a request for a resource with a request dispatch process; computer program instructions configured to cause a computer to determine a delay value, the delay value determined with the request dispatch process; and computer program instructions configured to cause a computer to dispatch the request and the delay value to a request handling process for handling. The acceptable response time may be received with the request; the acceptable response time may be determined by a port through which the request arrives. Also, the request may include a path identifying the resource and the path comprises the acceptable response time.

A still further aspect illustrative of features of the invention is a method for managing bandwidth utilization by a server in fulfilling requests for resources including transmitting an identifier of a resource available on a server to a client, the identifier comprising an acceptable response time; receiving a request for the resource from the client; extracting the acceptable response time from the identifier; and transmitting a response to the client after the expire of the acceptable response time.

BRIEF DESCRIPTION OF THE DRAWINGS

These and other features, aspects, and advantages of the present invention will become better understood with regard to the following description, appended claims, and accompanying drawings where:

DETAILED DESCRIPTION

Description of Figures

Figure 1:
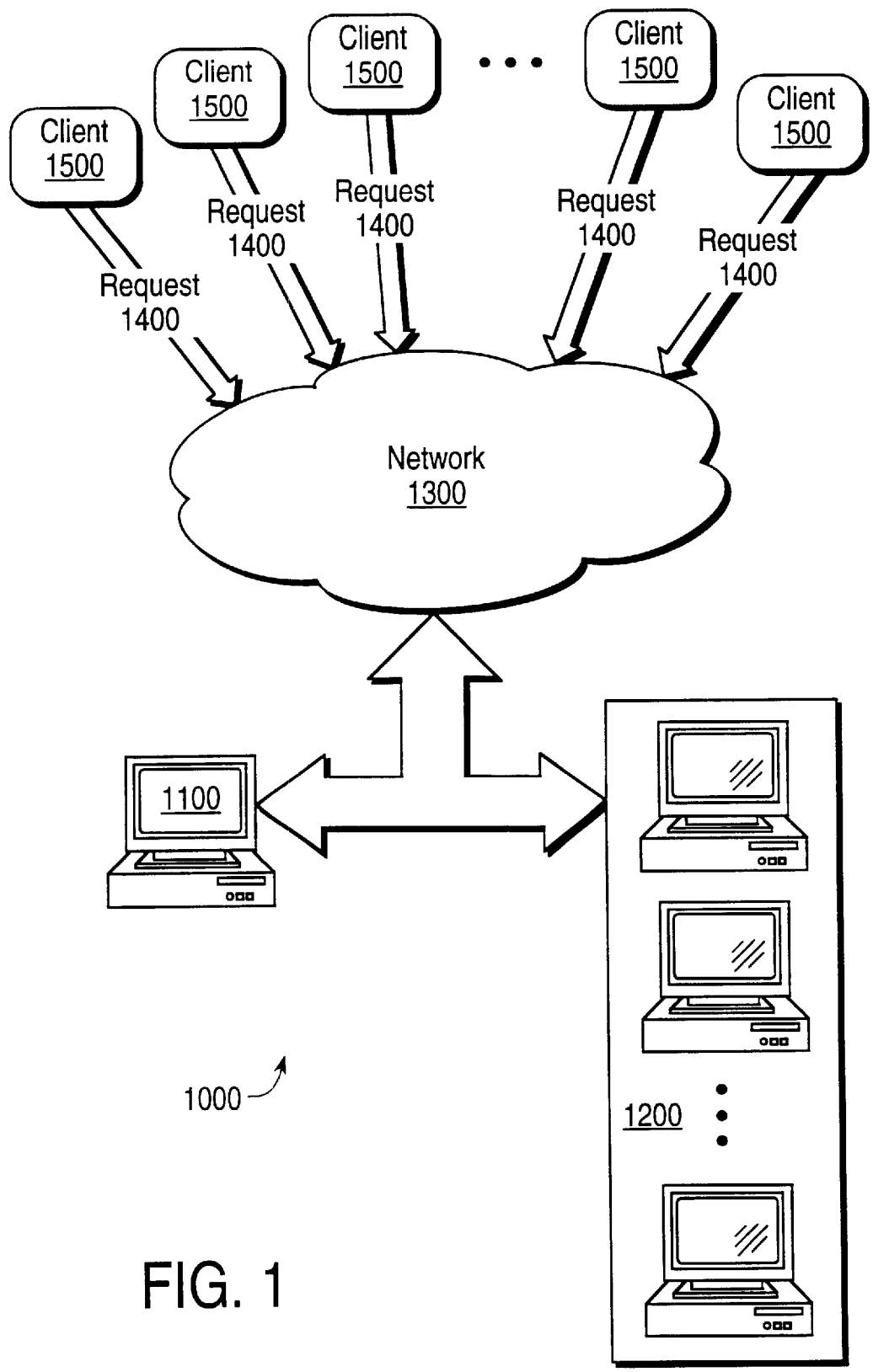
FIG. 1 is a block diagram showing elements in an operating environment in which server bandwidth utilization management can be employed.

FIG. 1 depicts several operating environment elements 1000 in which server bandwidth utilization management may be employed. A plurality of client applications 1500 are shown. The plurality of client applications 1500 are not limited with respect to any particular computing hardware. The plurality of client applications 1500 may be, for instance, general purpose computers, or special purpose computing machinery. In some embodiments, the plurality of client applications 1500 are resident on a hardware platform that integrates features of client/server communications and television control features. Conventional systems include 'set-top' boxes including, for instance, the WEBTV Plus, set-top box, available through WebTV Networks, Inc. of Palo Alto, Calif.

Illustrative versions of the invention obtain particular benefits in conjunction with enhanced television ("ETV"). In an illustrative ETV context, a video production is distributed to the plurality of client applications 1500. The video production has associated with it, one or more enhancing resources that may be selected by a viewer of the video production. Conventionally, the enhancing resources are made available to the viewer by including an identifier of the resource in the video production. The viewer's set-top box extracts the resource identifier and provides and indication to the viewer that enchanting resources are available. If the viewer selects the resource, a request is sent with the client application resident in the viewer's set-top box.

Typical of the ETV context, is the aspect that the plurality of client applications 1500 send a plurality of client requests 1400 contemporaneously. This aspect is typically present when, for instance, the video production is broadcast and each viewer becomes aware of the availability of the enhancing resource from the broadcast video production virtually simultantaneously.

Commonly the plurality of client requests 1400 sent from the plurality of client applications 1500 travel over a network 1300 that is open. Most commonly the network 1300 comprises a portion of the Internet. Conventionally, the enhancing resources are identified by a Uniform Resource Identifier ("URI").

Figure 2:
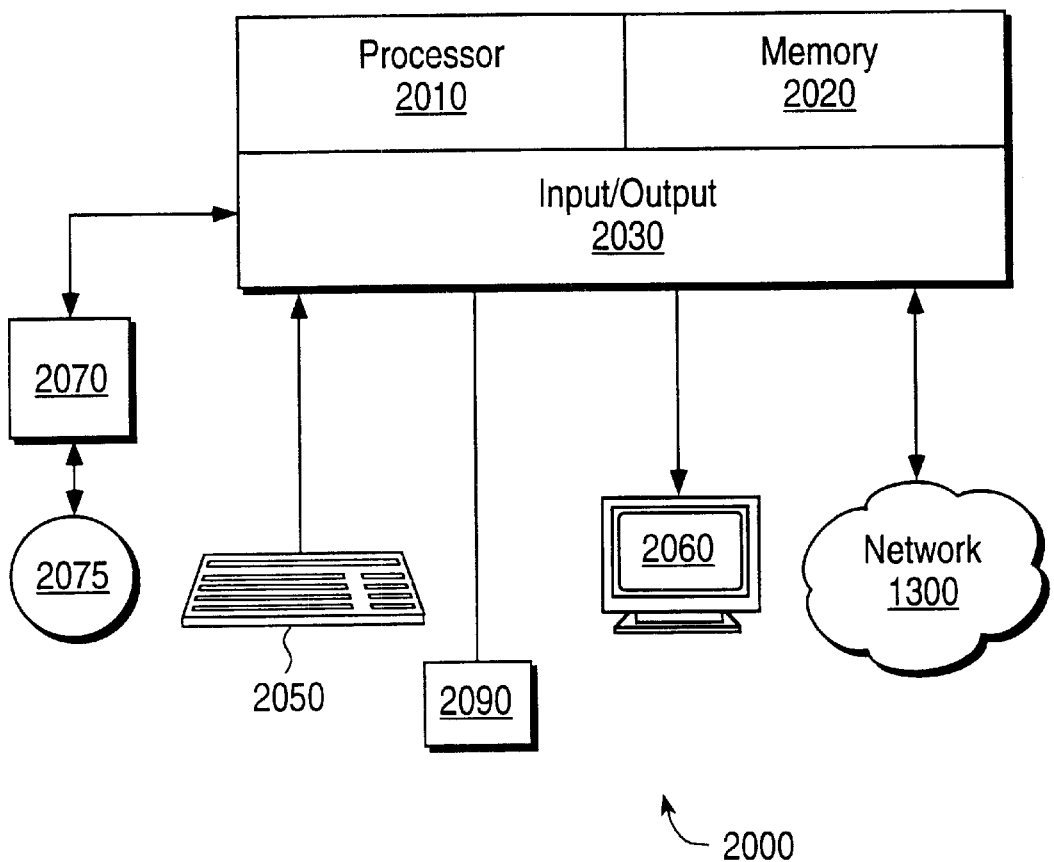
FIG. 2 depicts a computer system capable of being configured to embody aspects of the invention in accordance with an illustrative embodiment.

FIG. 1 also shows a stand-alone server 1100 and a multi-server cluster 1200. Methods according to the invention may be computer implemented. FIG. 2 depicts a computer system 2000 capable of embodying aspects of the invention. The stand-alone server 1100 or servers in the multi-server cluster 1200 may be structures in accordance with the computer system 2000. The computer system 2000 comprises a microprocessor 2010, a memory 2020 and an input/output system 2030 (including an interface to the network 1300). Further illustrated is a media drive 2070, such as a disk drive, CD-ROM drive, or the like. The media drive 2070 may operate with a computer-usable storage medium 2075 capable of storing computer-readable program code able to configure the computer system 2000 to embody aspects of the invention. The input/output system 2030 may also operate with a keyboard 2050, a display 2060, and a pointing device 2090. As illustrated, the computer system 2000 is general-purpose computing machinery. As one of skill recognizes, programmed instructions may configure general purpose computing machinery to embody structures capable of performing functions in accordance with aspects of the invention. So configured, computing machinery provides structural elements for performing functions in accordance with the invention. Special purpose computing machinery comprising, for example, an application specific integrated circuit (ASIC) may also be used. One skilled in the art will recognize numerous structures of programmed or programmable logic capable of being configured to embody aspects of the invention. In some illustrative embodiments, the computer system 2000 is an UltraSPARC workstation from Sun Microsystems of Mountain View, Calif., that runs the SOLARIS operating system (also from Sun) and the Apache HTTP. (web) server application (widely available in commercial products and also from <http://www.apache.org>). Servers in the multi-server cluster 1200 may be configured similarly to the stand-alone server 1100, and conventional load balancing methods may be employed to distributed requests to servers in the multi-server cluster 1200. Features of the invention may operate with just the stand-alone server 1100, just the multi-server cluster 1200, or both.

Figure 3:
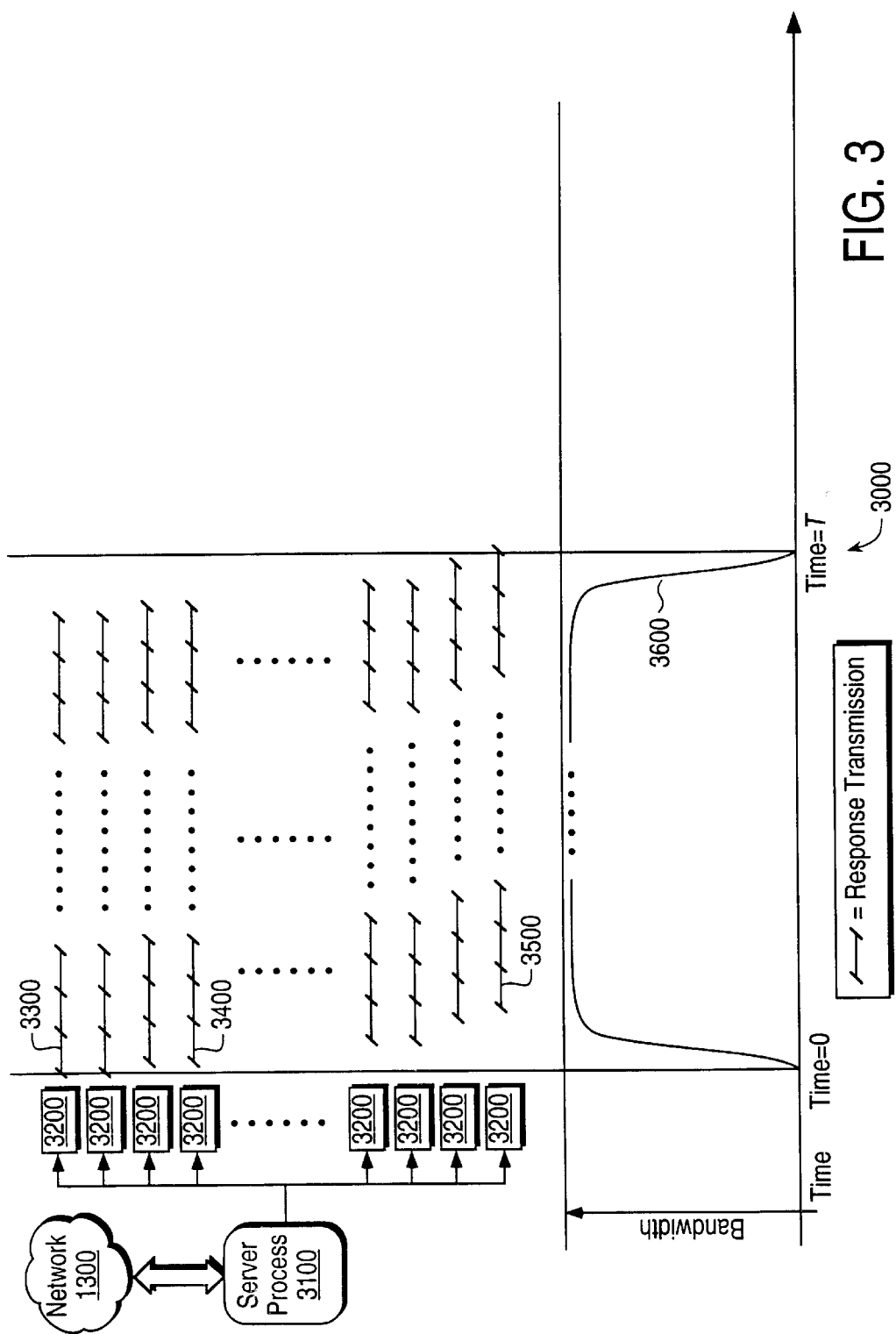
FIG. 3 depicts a conventional peak bandwidth consumption event.

FIG. 3 depicts a peak bandwidth consumption event 3000 as conventionally created by one or more severs such as the stand-alone server 1100 or the multi-server cluster 1200 (for purposes of illustration, reference is made to one server of the multi-server cluster 1200). The plurality of client requests 1400 arrive over the network 1300 and a portion are distributed to each server in the multi-server cluster 1200 where they are accepted by a server process 3100. As depicted, the server process 3100 acts as a central dispatch for the requests which are passed to a set of request handlers 3200 to generate and transmit responses to the plurality of client applications 1500. The particular number in the set of request handlers 3200 is not fundamental. As the requests arrive, starting at TIME=0 and spread out over some short time interval, each of the set of request handlers 3200 generates a response for its request. This may involve, for instance, retrieving a file from storage, and/or running an executable script or program, and begins transmitting the response to the client. As time flows from left to right in FIG. 3, it is appreciated that a first response transmission 3300 initiates first, a second response transmission 3400 slightly later, and a third response transmission 3500 later still. These three are merely illustrative of the numerous response transmission events depicted in FIG. 3.

Each response transmission consumes communications bandwidth equal to the rate and which the response is transmitted. For instance, if the plurality of client applications 1500 receive the responses with, for instance, the current generation of set-top boxes which contain modems that operate at approximately 40–50 kilobits/second, this rate will typically be the rate of transmission for that response, as the set of request handlers 3200 executing on servers in the multi-server cluster 1200 typically can generate output at a greater rate. A bandwidth consumption graph 3600 depicts how the server process 3100 of the one server of the multi-server cluster 1200 consumes bandwidth as responses are transmitted. In a conventional ETV context, as requests arrive substantially contemporaneously, and in great volume, bandwidth consumed in serving responses rapidly peaks. Moving from top to bottom in FIG. 3, the bandwidth consumed by simultaneous response transmissions of each of the set of request handlers 3200 can be summed and is approximated by the bandwidth consumption graph 3600. As the event in the video production which offered the enhancing resource passes, the frequency of requests for this enhancing resource begin to slow and return to a baseline level, indicating the end of the peak bandwidth consumption event 3000 at TIME=T.

As can be seen in the bandwidth consumption graph 3600, there is a temporal window in which numerous requests for resources arrive at the server process 3100 of the one server of the multi-server cluster 1200. The bandwidth consumed in responding to the requests can exceed a maximum acceptable bandwidth consumption. For instance, assuming 500 request handling processes per server, in a multi-server cluster of fifty servers, each request handling process transmitting to a client at a 40 kilobit / second rate, the instantaneous bandwidth consumption for the total response transmissions from the multi-server cluster would be 1 gigabit / second. If server capacity were available to respond to, for instance 1,000,000 simultaneous resource requests, required bandwidth consumption would be 40 gigabits / second. This amount of bandwidth is not conveniently available in practice with current telecommunications technology, yet in a typical ETV context, 1,000,000 substantially simultaneous resource requests are expected. Even if sufficient bandwidth were available at commercially practicable cost to simultaneously serve 1,000,000 response transmissions, current pricing practice would make this inefficient. As bandwidth is conventionally priced at a rate which is a function of peak bandwidth consumption over the billing period, the brief periods of substantial bandwidth consumption would result in a much higher bandwidth cost than if the response requests were distributed over a longer time period.

Figure 4:
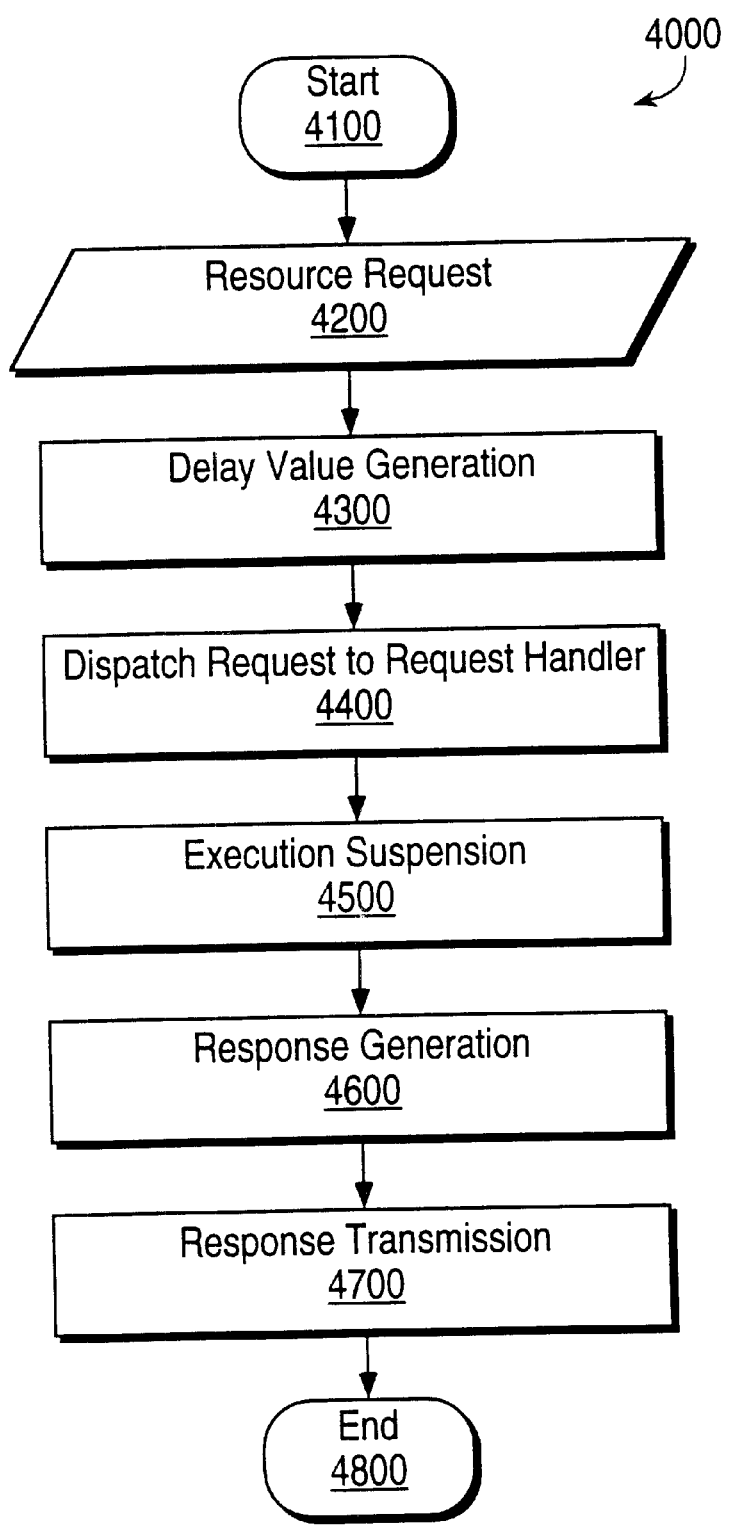
FIG. 4 depicts flow diagram for a method of server bandwidth utilization management with delay value generation in a centralized dispatch process in accordance with an illustrative embodiment.

FIG. 4 depicts a method of server bandwidth utilization management using centralized process dispatch 4000. in accordance with an illustrative embodiment of the invention. In this illustrative embodiment, steps of this method are performed by a server process. The particular server application is not fundamental, and others may be used without limitation, on variants of POSIX-like operating systems, WINDOWS operating systems from Microsoft Corp. of Redmond, Wash., or other operating systems.

Process flow initiates at a 'start' terminal 4100 and continues when the server process receives a 'resource request' data block .4200 from the network 1300. In this illustrative embodiment, the 'resource request' data block 4200 is a Request Message in accordance with the Hypertext Transfer Protocol ("HTTP"). However, as one of skill in the art will appreciate, other embodiments of the invention could work with other communication protocols and the particular protocol is not fundamental.

Next, a 'delay value generation' process 4300 predetermines a delay value for the duration execution will be suspended in generating a response for the request. The delay value is preferably bounded above by an acceptable response time ("ART") for fulfilling the request. Further, a series of delay values generated by repeated execution of the 'delay value generation' process 4300 is preferably approximately uniformly distributed over the range [0, ART]. Embodiments in which this latter condition does not hold, may exhibit the undesirable property of simply shifting the peak bandwidth consumption to a later point in time, without reducing it.

Many methods are suitable for generating a series of delay values with the above properties. Conventional pseudo-random number generators ("PRNG") may be used, and many may be found in Donald Knuth,*The Art of Computer Programming*, Vol.2, Chapter 3 (Addison Weseley, 3rd. ed.) incorporated herein by this reference. In one preferred embodiment a linear congruential generator is used. As the computing resources involved with generating pseudorandom numbers. with statistical properties of near randomness can be substantial, other embodiments could use other functions that do generate a uniformly distributed sequence of delay values, which are not nearly random. In still other embodiments, delay values could be computed, with or without a PRNG, before the peak bandwidth consumption event is expected and stored in a (preferably memory-resident) data structure. In such embodiments, the 'delay value generation' process 4300 would perform a lookup operation in the data structure to generate the delay value.

Process flow continues to a 'dispatch request to request handler' process 4400 in which the server process passes the request and the delay value to a request handling process that will generate and transmit the response to the client. Next an 'execution suspension' process 4500 suspends execution of the request handling process for a time interval equal to the delay value passed to the request handling process. Operating system facilities may be used to suspend execution of the request handling process or as may other well-known methods. In a multi-threaded environment, thread synchronization methods could be used. More generally, conventional event dispatching, suspending, or scheduling facilities could be used.

Next, a 'response generation' process 4600 performs the steps necessary to generate the response appropriate for the requested resource. The particular steps necessary are not fundamental to the present invention and may depend on the requested resource. For instance, a plain file may only need to be retrieved from a file system or memory, or executable code may be run to generate the response. Process flow continues to a 'response transmission' process 4700 that transmits the response from the 'response generation' process 4600 to the requesting client application. Process flow then completes through an 'end' terminal 4800.

Figure 5:
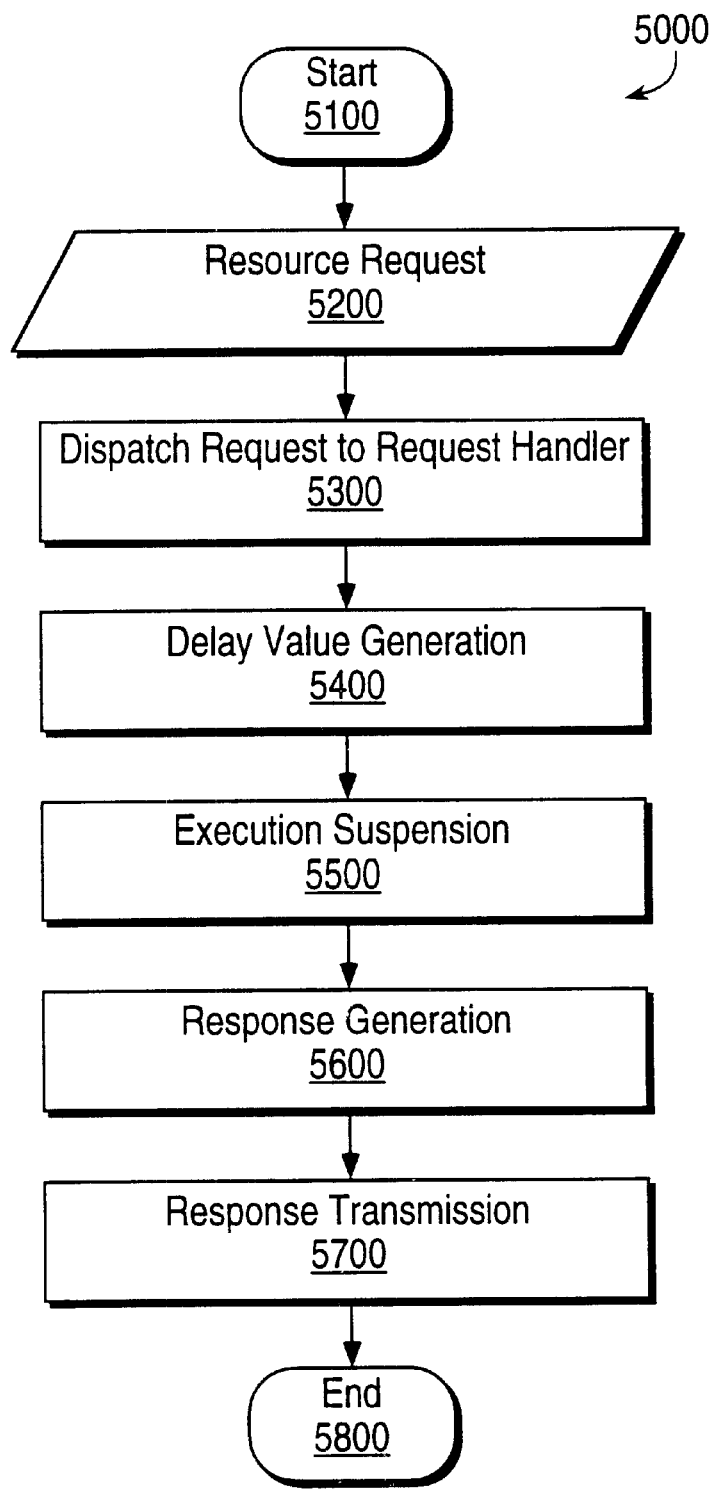
FIG. 5 depicts flow diagram for a method of server bandwidth utilization management with delay value generation in a request handling process in accordance with an illustrative embodiment.

A further illustrative embodiment may be understood and practiced with reference to FIG. 5. In this illustrative embodiment, steps of this method are performed by a server process, for instance a suitably modified version of the Apache HTTP server (running as a continuously executing daemon). Further, delay values are generated by request handling processes rather than by the server process that dispatches requests for resources to request handling processes. Except as described below, this embodiment is similar to that described above in connection with the method of server bandwidth utilization management using centralized process dispatch 4000.

Process flow initiates at a 'start' terminal 5100 and continues to receive a 'resource request' data block 5200 from the network 1300. Then, a 'dispatch request to request handler' process 5300 communicates the information from the 'resource request' data block 5200 to a request handling process that will generate a response. Next, a 'delay value generation' process 5400 is performed by the request handling process. The 'delay value generation' process 5400 predetermines a delay value for the duration execution will be suspended in generating a response for the request. The delay value may be created in any of the ways described above. In addition, when the delay value is generated by the request handling process, as in this illustrative embodiment, an additional property is desirable.

As noted, typically several request handling processes execute concurrently, each independently receiving resource requests from a central dispatch process, generating responses, and transmitting responses. If each of the several request handling processes were to use an identical method of generating delay values, the sequence of requests could simply be shifted in time, rather than dispersed over time, without any reduction in peak bandwidth consumption in transmitting responses. For instance, if each request handling process used the same PRNG with the same seed value, each request handling process could generate the same pseudo-random sequence. As each request arrived, it would be dispatched to a request handling process that would generate the same delay value as generated for a preceding and succeeding request; the requests would then be handled at the same time (relative to each other) as if no delay value were generated, although they would be moved forward in time by the amount of the delay value. Accordingly, when the request handling processes themselves generate the sequences of the delay values, the sequences should be substantially uncorrelated. This may be achieved, for instance, by using PRNGs to generate the delay values and using different seed values for each request handling process. Other methods within the knowledge of one skilled in the art having the benefit of this disclosure could also be used. From the 'delay value generation' process 5400, process flow continues to an 'execution suspension' process 5500, a 'response generation' process 5600, and a 'response transmission' process 5700 that perform the same functions as the corresponding processes described above in connection with FIG. 4. Process flow completes through an 'end' terminal 5800.

Figure 6:
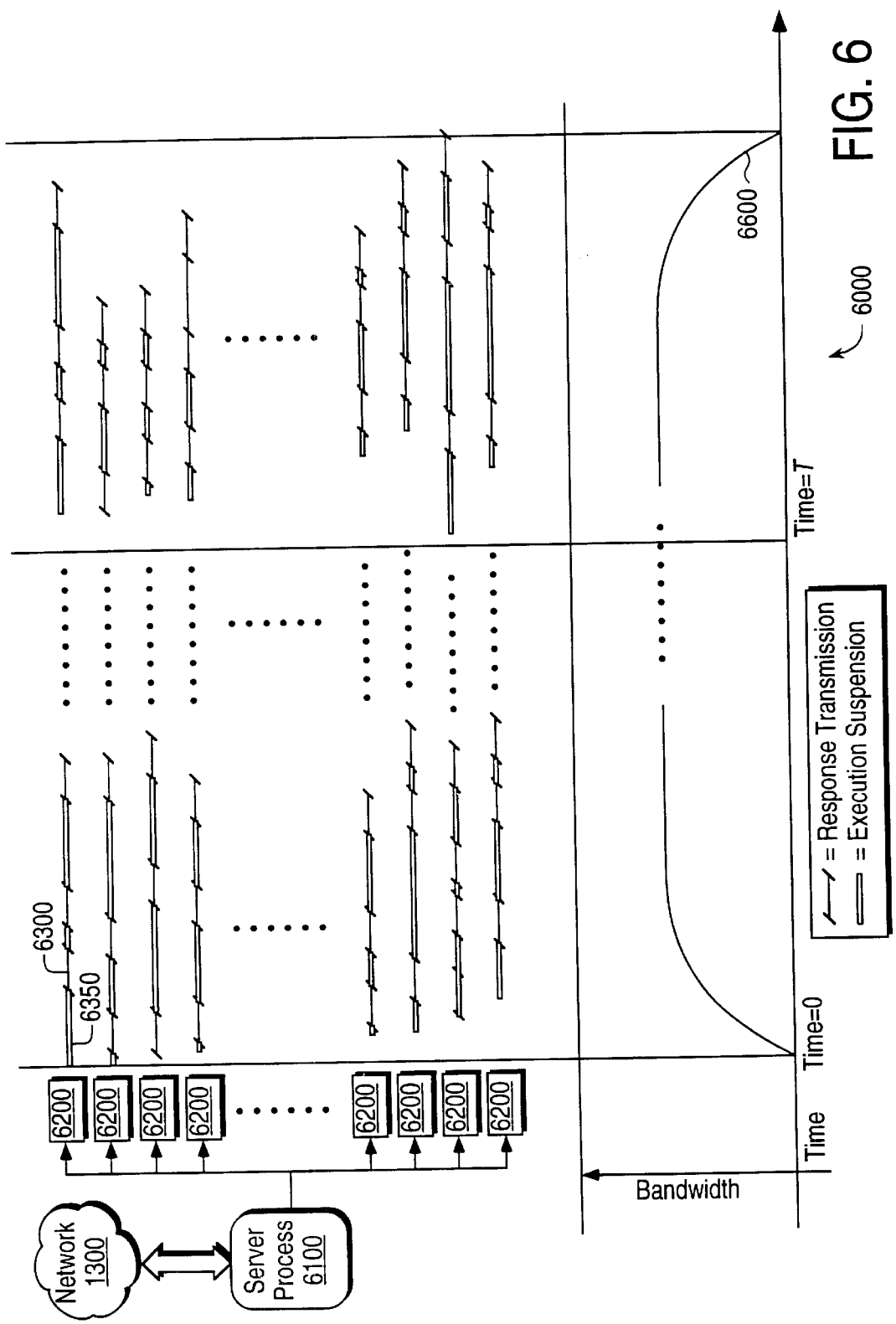
FIG. 6 depicts a peak bandwidth consumption event with bandwidth utilization management.

Advantages of embodiments of the present invention can be understood with reference to FIG. 6 that depicts a peak bandwidth consumption event with bandwidth utilization management 6000. Features of the illustrative embodiments can be appreciated with reference to FIG. 3 and FIG. 6. As in FIG. 3, a server process 6100 accepts connections for resource requests from the network 1300. The server process 6100 then dispatches the requests to a set of request handlers 6200. Methods such as those described above in connection with either FIG. 4 or FIG. 5 may be used to generate delay values for each of the set of request handlers 6200.

Illustrative of the introduction of delay values in transmitting responses to resource requests are a first response transmission 6300 and a first execution suspension 6350. These are simply illustrative of the numerous response transmission and execution suspension events generated by the server process 6100 and the set of request handlers 6200 in responding to a peak bandwidth consumption event. The effect of the incorporation of delay values in responding to requests for resources can be appreciated with reference to a bandwidth consumption graph 6600. Contrasting the bandwidth consumption graph 6600 of FIG. 6 and the bandwidth consumption graph 3600 of FIG. 3, it will be appreciated that peak bandwidth consumption is reduced in the bandwidth consumption graph 6600 of FIG. 6, however the bandwidth consumption event is spread out over a longer time period. The same number of response transmissions are depicted occurring in FIG. 3 and FIG. 6; and accordingly, the same number of bits are transmitted to the clients. However the incorporation of delay values before response transmissions creates a situation where, at any given instant during the bandwidth consumption event, a fraction of the set of request handlers 6200. have their execution suspended and therefore are not consuming bandwidth. Peak bandwidth is accordingly diminished.

In some embodiments, an acceptable response time is encoded in an uniform resource identifier that is communicated to a client. When the client sends a request for a resource available via the uniform resource identifier, the acceptable response time can be extracted from the server accepting the request and be used to generate an appropriate delay value.

Figure 7:
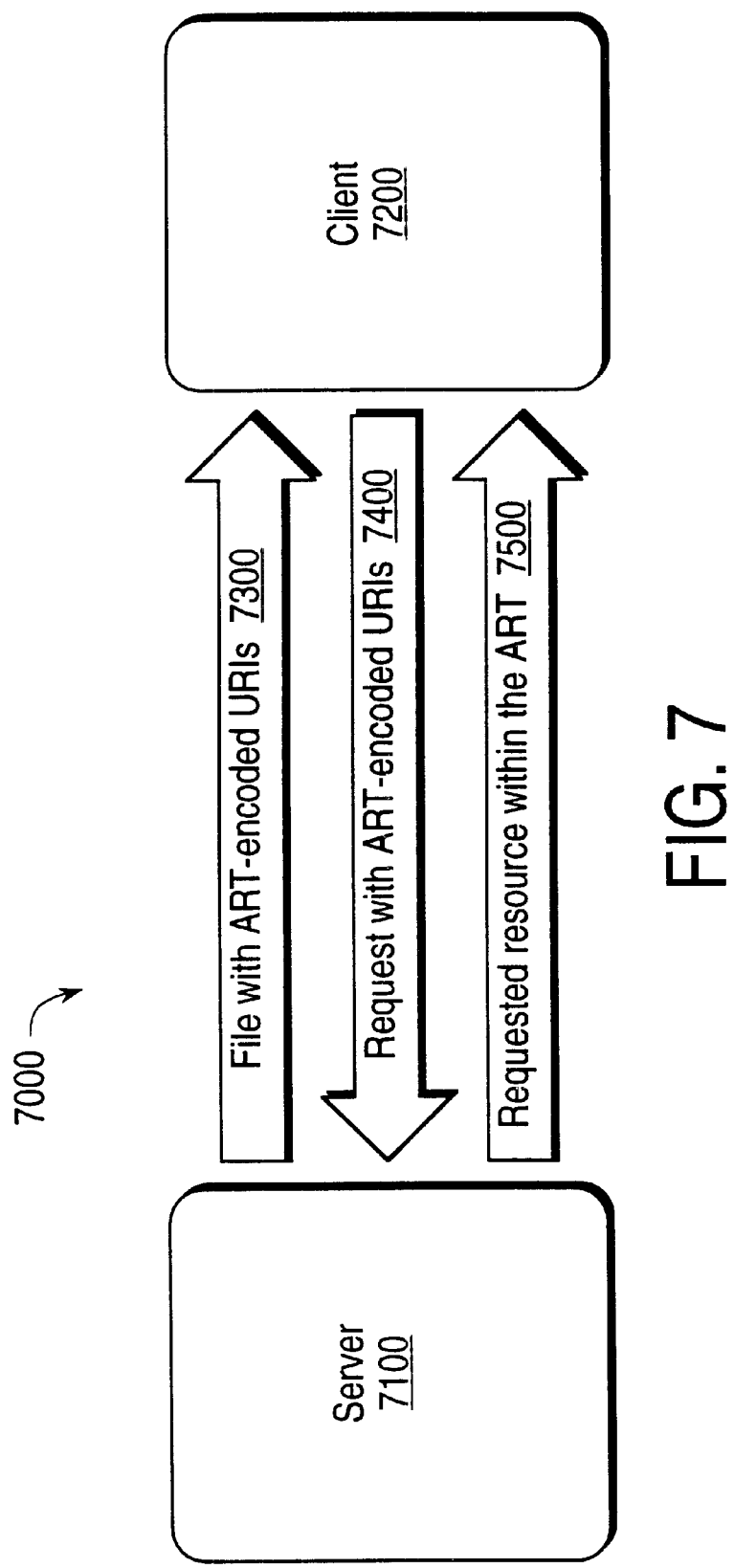
FIG. 7 depicts bandwidth utilization management with ARTs encoded in URIs.

One illustrative embodiment may be appreciated with reference to FIG. 7 that depicts a method of bandwidth utilization management with ART-encoded URIs 7000. A server 7100 transmits a file with ART-encoded URIs 7300 to a client 7200. The client 7200 responds at a later time with a request with ART-encoded URI 7400 and thereafter the server 7100 transmits a response within the ART 7500.

Referring to the file with ART-encoded URIs 7300, other contents of the file are not fundamental. In this illustrative embodiment the file is any conventional HTML page, or other file comprising an uniform resource identifier with an acceptable response time encoded therein. In some embodiments, the page is transmitted to the client in response to a previous request for a resource. In other embodiments, the client may preload and cache the page and the resource identified by the uniform resource identifier in the page. In some embodiments the Channel Definition Format ("CDF"), is used. In these embodiments, the file sent from the server 7100 to the client 7200 is a file complying with the CDF Specification (available from the World Wide Web Consortium at <http://www.w3.org/TR/NOTE-CDFsubmit.html> and Microsoft, Corp. of Redmond, Wash.). The CDF file references one or more resources that will be automatically updated at scheduled intervals in conformance with the CDF, and the references to the resources are URIs having ARTs encoded therein.

Within the general framework of the Hypertext Transfer Protocol, an uniform resource identifier is, generically, of the form:

"http:" "//"host[":"port][path]

'Port' refers to the port on the server through which a connection should be established in retrieving the resource. 'Path' refers to additional information used in retrieving a resource whose particular significance depends on the context. The 'port' or 'path' portions of an uniform resource identifier may be used for transport of an acceptable response time. Conventionally, port numbers up through 1024 are reserved, and higher numbered ports are preferably used.

In one embodiment, the acceptable response time is encoded as the 'port' portion of an uniform resource identifier. The acceptable response time may use, for instance, seconds as the unit of time measurement and start with 1025 corresponding to 1 second to avoid using ports 1024 or lower. In this embodiment, the server 7100 accepts HTTP connections on several ports. The number of the port on which the connection is established provides the acceptable response time for the request. For each port, the server process 6100 generates a delay value in the range [0, acceptable response time]. An illustrative uniform resource identifier in accordance with this embodiment is set forth below:

http://www.b3tv.com:1034/foo/bar/index.html

This uniform resource identifier could be sent to the client 7200 in the file with ART-encoded URIs 7300 and the client 7200 could send a request for the request with ART-encoded URI 7400. This could be in response to, for instance, a user's selection of an associated hyperlink, a caching preload operation of the client 7200, or an automatically updating resource such as those associated with the CDF. The server 7100 could then generate a delay value bounded above by the acceptable response time and provide a response within the ART 7500.

In another embodiment, the acceptable response time is encoded in the 'path' portion of the uniform resource identifier. The acceptable response time may again be in seconds. In this embodiment, the server process 6100 accepts HTTP connections on either one or several ports. In accordance with the HTTP specification, when no port is specified, port 80 is assumed. The number in the path provides the acceptable response time for the request. For each uniform resource identifier, the server process 6100 generates a delay value in the range [0, ART]. An illustrative uniform resource identifier in accordance with this embodiment is set forth below:

http://www.b3tv.com/foo/bar/index.html..10

This uniform resource identifier could be sent to the client 7200 in the file with ART-encoded URIs 7300 and the client 7200 could send a request for the request with ART-encoded URI 7400. This could be in response to, for instance, a user's selection of an associated hyperlink, a caching preload operation of the client 7200, or an automatically updating resource such as those associated with the CDF. The server 7100 could then extract the acceptable response time and generate a delay value bounded above by the acceptable response time and provide a response within the ART 7500.

All documents, standards, protocols, and draft protocols referred to herein are incorporated herein by this reference in their entirety.

Although the present invention has been described in terms of features of illustrative embodiments, one skilled in the art will understand that various modifications, alterations, and omissions may be made without departing from the scope of the invention. Accordingly, the scope of the invention is not to be limited to the particular embodiments discussed herein, but should be defined only by the appended claims and equivalents thereof.

What is claimed is:

1. A computer-implemented method for managing bandwidth utilization by a server in fulfilling requests for resources, said method comprising:
   receiving a request for a resource;
   generating a delay value, said delay value less than an acceptable response time;
   delaying fulfillment of said request by a predetermined time period, for reducing instantaneous bandwidth utilization by said server; and thereafter fulfilling said request for said resource.

2. The method according to claim 1 wherein said delaying step comprises:
   waiting for a time interval at least as great as said delay value to elapse.

3. The method according to claim 2 wherein said delay value is an element of a sequence distributed substantially uniformly between zero and said acceptable response time.

4. The method according to claim 3 wherein said sequence is a pseudo-random sequence.

5. The method according to claim 3 wherein said acceptable response time is received with said request.

6. The method according to claim 5 wherein said acceptable response time is determined by a port through which the request arrives.

7. The method according to claim 5 wherein said request comprises a path identifying said resource and said path comprises said acceptable response time.

8. The method according to claim 1 wherein receiving a request for a resource comprises:
   receiving a request for a resource with a request dispatch process;
   determining a delay value, said delay value determined with said request dispatch process; and
   dispatching said request and said delay value to a request handling process for handling.

9. An apparatus comprising a processor, a memory, a network interface, and a file system, programmed instructions configuring said apparatus to accept connections in order to service requests by sending responses thereto, said apparatus further configured with programmed instructions comprising:
   a request receiver configured for receiving a request for a resource;
   a delay value generator configured for generating a delay value, said delay value less than an acceptable response time;

a response fulfillment delayer configured for delaying fulfillment of said request by a predetermined time period; and a request handler configured for fulfilling said request for said resource.

10. The apparatus according to claim 9 wherein said response fulfillment delayer comprises:

a timer configured for waiting for a time interval at least as great as said delay value to elapse.

11. An apparatus according to claim 10 wherein said delay value is an element of a sequence distributed substantially uniformly between zero and said acceptable response time.

12. The method according to claim 10 wherein said sequence is a pseudo-random sequence.

13. An apparatus according to claim 12 wherein said acceptable response time is received with said request.

14. An apparatus according to claim 13 wherein said acceptable response time is determined by a port through which the request arrives.

15. An apparatus according to claim 13 wherein said request comprises a path identifying said resource and said path comprises said acceptable response time.

16. The method according to claim 10 wherein said request receiver comprises:

a request receiver configured for receiving a request for a resource with a request dispatch process;

a delay value determiner configured for determining a delay value with said request dispatch process; and a request dispatcher configured for providing said request and said delay value to a request handling process.

17. A computer program product comprising a computer-readable medium having computer readable instructions encoded thereon for server bandwidth utilization management, comprising:

computer program instructions configured to cause a computer to receive a request for a resource;

computer program instructions configured to cause a computer to generate a delay value, said delay value less than an acceptable response time;

computer program instructions configured to cause a computer to delay fulfillment of said request by a predetermined time period; and computer program instruction configured to cause a computer to fulfill said request for said resource after expire of said predetermined time period.

18. The computer program product according to claim 17 wherein said delaying step comprises:

computer program instructions configured to cause a computer to wait for a time interval at least as great as said delay value to elapse.

19. The computer program product according to claim 18 wherein said delay value is an element of a sequence distributed substantially uniformly between zero and said acceptable response time.

20. The computer program product according to claim 19 wherein said sequence is a pseudo-random sequence.

21. The computer program product according to claim 17 wherein said computer program instructions configured to cause a computer to receive a request for a resource comprises:

computer program instructions configured to cause a computer to receive a request for a resource with a request dispatch process;

computer program instructions configured to cause a computer to determine a delay value, said delay value determined with said request dispatch process; and computer program instructions configured to cause a computer to dispatch said request and said delay value to a request handling process for handling.

22. The computer program product according to claim 3 wherein said acceptable response time is received with said request.

23. The computer program product according to claim 22 wherein said acceptable response time is determined by a port through which the request arrives.

24. The computer program product according to claim 22 wherein said request comprises a path identifying said resource and said path comprises said acceptable response time.

25. A method for managing bandwidth utilization by a server in fulfilling requests for resources, said method comprising:

transmitting an identifier of a resource available on a server to a client, said identifier comprising an acceptable response time;

receiving a request for said resource from said client;

extracting said acceptable response time from said identifier; and transmitting a response to said client after the expire of said acceptable response time.

* * * * *